(12) United States Patent
Song et al.

(10) Patent No.: US 9,954,466 B2
(45) Date of Patent: Apr. 24, 2018

(54) UNMANNED AERIAL VEHICLE AND DATA PROCESSING METHOD THEREOF

(71) Applicant: SZ DJI TECHNOLOGY CO., LTD., Shenzhen (CN)

(72) Inventors: Jianyu Song, Shenzhen (CN); Jun Shi, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 52 days.

(21) Appl. No.: 15/125,059

(22) PCT Filed: Mar. 14, 2014

(86) PCT No.: PCT/CN2014/073424
§ 371 (c)(1),
(2) Date: Sep. 9, 2016

(87) PCT Pub. No.: WO2015/135194
PCT Pub. Date: Sep. 17, 2015

(65) Prior Publication Data
US 2017/0025971 A1    Jan. 26, 2017

(51) Int. Cl.
*H02P 5/46* (2006.01)
*G05D 1/10* (2006.01)
*B64C 39/02* (2006.01)

(52) U.S. Cl.
CPC .............. *H02P 5/46* (2013.01); *B64C 39/024* (2013.01); *G05D 1/101* (2013.01); *B64C 2201/042* (2013.01); *B64C 2201/141* (2013.01)

(58) Field of Classification Search
CPC ......... H02P 5/46; G05D 1/101; B64C 39/024; B64C 2201/042; B64C 2201/141
See application file for complete search history.

(56) References Cited

U.S. PATENT DOCUMENTS 8,448,898 B1 * 5/2013 Frolov ............... B64C 39/024
                                                  244/59
9,828,107 B1 * 11/2017 Ruymgaart ........... B64D 31/06
(Continued)

FOREIGN PATENT DOCUMENTS

CN         102183941         9/2011
CN         102424112         4/2012
(Continued)

OTHER PUBLICATIONS

English-language extended Search Report from the European Patent Office in counterpart European Application No. EP 14 88 5377.3 dated Aug. 17, 2017.
(Continued)

*Primary Examiner* — Russell Frejd
(74) *Attorney, Agent, or Firm* — Finnegan, Henderson, Farabow, Garrett & Dunner, L.L.P.

(57) ABSTRACT

The present disclosure discloses an unmanned aerial vehicle comprising at least two controllers, at least two electronic speed controllers and at least two motors, wherein: the at least two electronic speed controllers are electrically connected with the at least two controllers to obtain at least two sets of control data respectively from the at least two controllers, select optimal control data from the at least two sets of control data, and control a rotation speed of the corresponding motor according to the optimal control data. The present disclosure further discloses a data processing method of an unmanned aerial vehicle. The electronic speed controllers of the present disclosure may be able to receive data directly from the controllers and select the optimal control data for controlling the rotation speed of the motors, thereby effectively reducing design costs and safety risks.

9 Claims, 2 Drawing Sheets

(56) References Cited

U.S. PATENT DOCUMENTS

| | | | |
|---|---|---|---|
| 2008/0084171 A1 | 4/2008 | Leehey et al. | |
| 2008/0308685 A1 | 12/2008 | Decker | |
| 2011/0062903 A1 | 3/2011 | Li et al. | |
| 2012/0209456 A1* | 8/2012 | Harmon | B64C 39/024 701/3 |
| 2015/0105946 A1* | 4/2015 | Kumar | B64C 39/024 701/3 |
| 2016/0280369 A1* | 9/2016 | Pounds | A63H 27/00 |

FOREIGN PATENT DOCUMENTS

| | | |
|---|---|---|
| CN | 203289361 | 11/2013 |
| CN | 203372391 | 1/2014 |
| JP | 2011-041747 | 3/2011 |
| JP | 2011-251678 | 12/2011 |
| WO | WO-2008/097319 | 8/2008 |
| WO | WO 2012/029057 A1 | 3/2012 |

OTHER PUBLICATIONS

International Search Report dated Nov. 26, 2014, in corresponding International Application No. PCT/CN2014/073424 issued by the State Intellectual Property Office of the P.R. China; 7 pages.

* cited by examiner

UNMANNED AERIAL VEHICLE AND DATA PROCESSING METHOD THEREOF

CROSS REFERENCE TO RELATED APPLICATIONS

This application is a national phase application of International Application No. PCT/CN2014/073424, filed Mar. 14, 2014, the content of which is incorporated herein by reference in its entirety.

TECHNICAL FIELD

The present application relates to the field of airplane, and particularly to an unmanned aerial vehicle and a data processing method thereof.

BACKGROUND OF THE INVENTION

In conventional unmanned aerial vehicles (UAVs) mode, an arbiter 14 is commonly employed in data processing. As illustrated in FIG. 1, FIG. 1 illustrates a structure of a UAV in the prior art, the arbiter 14 communicates data with each of the controllers, and determines the controller from which the data is used by an electronic speed controller. For instance, the arbiter 14 receives data from a first controller 11, a second controller 12, and a third controller 13, after the reception of the data, the arbiter 14 analyzes the data to acquire the optimal control data, and controls a controller corresponding to the optimal control data (e.g., the first controller 11) to communicate data with the electronic speed controller, such that the electronic speed controller controls a rotation speed of a motor based on the optimal control data. Although the data for the electronic speed controller is guaranteed to be optimal in conventional techniques, the data of the controller cannot be transmitted to the electronic speed controller if the arbiter 14 fails to work, and the operation of the UAV may fail as well.

In view of the above, it is necessary to provide an unmanned aerial vehicle and a data processing method thereof to address the problems as discussed hereinabove.

SUMMARY OF THE INVENTION

An objective of the present disclosure is to provide an unmanned aerial vehicle and a data processing method thereof, by which an electronic speed controller can obtain data directly from controllers and select the optimal control data for controlling a rotation speed of a motor, thereby effectively reducing a design cost and safety risk.

In order to address the technical problems as discussed hereinabove, the present disclosure provides an unmanned aerial vehicle comprising at least two controllers, at least two electronic speed controllers, and at least two motors. In some embodiments, the at least two electronic controllers are electrically connected with the at least two controllers to obtain at least two sets of control data respectively from the at least two controllers; and the at least two electronic speed controllers is electrically connected with a corresponding one of the at least two motors respectively, and each of the at least two electronic speed controllers selects optimal control data from the at least two sets of control data and controls the rotation speed of the corresponding motor according to the optimal control data.

In some embodiments, after the optimal control data is selected, the at least two electronic speed controllers determine whether a difference between the optimal control data and other control data being within a predetermined range, and if the difference is not within the predetermined range, the at least two electronic speed controllers feed the optimal control data to the controllers corresponding to the other control data.

In some embodiments, the at least two electronic speed controllers select the control data, which is needed by the at least electronic speed controllers, and has the most volume of data from among the at least two sets of control data as the optimal control data.

In some embodiments, the at least two electronic speed controllers sort the at least two sets of control data in a descending order or an ascending order, and determine whether the number of the at least two sets of control data is odd; if the number of the at least two sets of control data is odd, the at least two electronic speed controllers select the (n+1)/2-th one of the sorted sets of control data as the optimal control data; otherwise, the at least two electronic speed controllers select the n/2-th or n/2+1-th one of the sorted sets of control data as the optimal control data, wherein n is the number of the at least two sets of control data.

In some embodiments, each of the at least two sets of control data may comprise pitch data, roll data, yaw angle data and altitude data.

In order to address the technical problems as discussed hereinabove, the present disclosure provides a data processing method of an unmanned aerial vehicle, the unmanned aerial vehicle comprising at least two controllers, at least two electronic speed controllers and at least two motors, the at least two electronic speed controllers being electrically connected with the at least two controllers, and the at least two electronic speed controllers being electrically connected with a corresponding one of the at least two motors respectively. The method may comprise: obtaining, by the at least two electronic speed controllers, at least two sets of control data respectively from the at least two controllers; selecting, by the at least two electronic speed controllers, optimal control data from the at least two sets of control data; and controlling, by the at least two electronic speed controllers, the rotation speed of the at least two motors according to the optimal control data.

In some embodiments, after selecting the optimal control data by the at least two electronic speed controllers, the method may further comprise the steps of: determining whether a difference between the optimal control data and other control data being within a predetermined range, and if the difference is not within the predetermined range, feeding the optimal control data to the controllers corresponding to other control data.

In some embodiments, selecting the optimal control data from the at least two sets of control data by the at least two electronic speed controllers may comprise: selecting, by the at least two electronic speed controllers, the control data which is needed by the at least electronic speed controllers and has the most volume of data from among the at least two sets of control data as the optimal control data.

In some embodiments, selecting the optimal control data from the at least two sets of control data by the at least two electronic speed controllers may comprise: sorting, by the at least two electronic speed controllers, the at least two sets of control data in a descending order or an ascending order, and determining whether the number of the at least two sets of control data is odd; if the number of the at least two sets of control data is odd, selecting the (n+1)/2-th one of the sorted sets of control data as the optimal control data; otherwise, selecting the n/2-th or n/2+1-th one of the sorted sets of control data as the optimal control data, wherein n being the number of the at least two sets of control data.

The advantageous effects of the present disclosure is in that, different from the prior arts, the unmanned aerial vehicle provided by the present disclosure may comprise at least two controllers, at least two electronic speed controllers, and at least two motors, wherein the at least two electronic speed controllers are electrically connected with the at least two controllers to obtain at least two sets of control data respectively from the at least two controllers; and the at least two electronic speed controllers is electrically connected with a corresponding one of the at least two motors respectively, and each of the at least two electronic speed controllers selects optimal control data from the at least two sets of control data and controls a rotation speed of the corresponding motor according to the optimal control data. In this way, the electronic speed controllers of the disclosure may be able to obtain data directly from the controllers and select the optimal control data for controlling the rotation speed of the motors. Furthermore, if a controller from which the optimal control data being received fails to work, the at least two electronic speed controllers may receive control data from other controllers and perform normal data transmission, thereby effectively reducing safety risks and design costs.

DETAILED DESCRIPTION OF THE INVENTION

The present disclosure will be described in detail with reference to drawings and embodiments.

Figure 1:
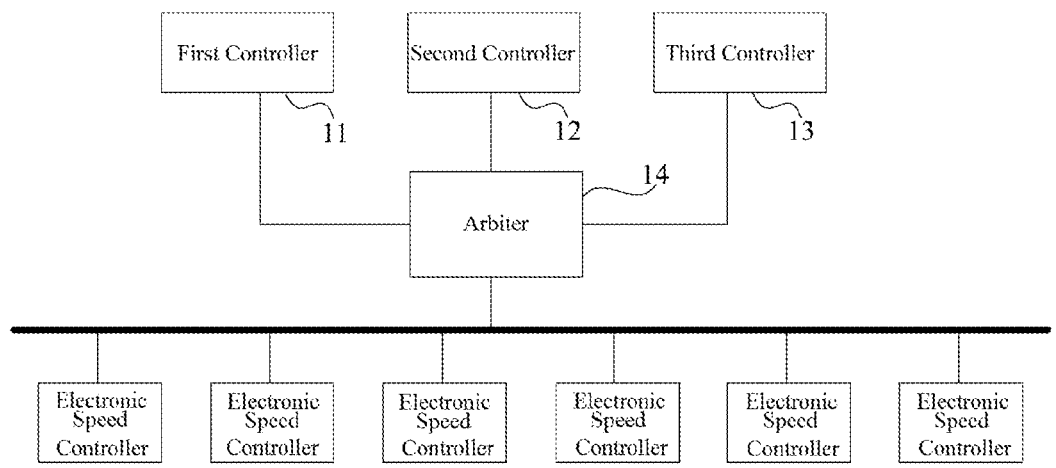
FIG. 1 is a diagram showing a structure of an unmanned aerial vehicle in prior art.
Figure 2:
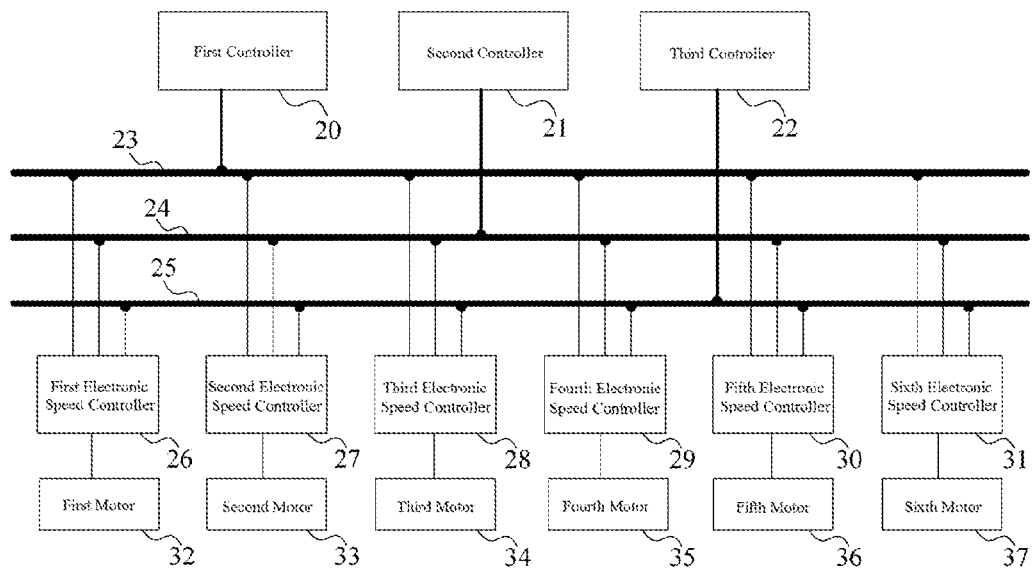
FIG. 2 is a diagram showing a structure of a first embodiment of an unmanned aerial vehicle according to the disclosure.

FIG. 2 is a diagram showing a structure of a first embodiment of an unmanned aerial vehicle according to the disclosure. The UAV may comprise at least two controllers, at least two electronic speed controllers and at least two motors.

The at least two controllers may generate at least two sets of control data, each of which may comprise pitch data, roll data, yaw angle data, altitude data and other data. In some instances, two, four, five or more controllers may be provided. The number of controllers may be determined based upon the actual needs. In some embodiments, three controllers are provided including a first controller 20, a second controller 21 and a third controller 22. In some instances, the first controller 20 may be connected with a first bus 23, the second controller 21 may be connected with a second bus 24, and the third controller 22 may be connected with a third bus 25.

In some embodiments, the electronic speed controllers are connected respectively with the controllers through the buses to receive control data from each of the controllers. Each of the electronic speed controllers may obtain from the controllers the pitch data, the roll data, the yaw angle data, the altitude data, and other data. In some instances, two, three, four, five or more electronic speed controllers may be provided. The number of the electronic speed controllers may be determined based upon the actual needs.

In some embodiments, the UAV may comprise six electronic speed controllers including a first electronic speed controller 26, a second electronic speed controller 27, a third electronic speed controller 28, a fourth electronic speed controller 29, a fifth electronic speed controller 30 and a sixth electronic speed controller 31. The first bus 23 may be electrically connected with the first electronic speed controller 26, the second electronic speed controller 27, the third electronic speed controller 28, the fourth electronic speed controller 29, the fifth electronic speed controller 30 and the sixth electronic speed controller 31. The second bus 24 may be electrically connected with the first electronic speed controller 26, the second electronic speed controller 27, the third electronic speed controller 28, the fourth electronic speed controller 29, the fifth electronic speed controller 30 and the sixth electronic speed controller 31. The third bus 25 may be electrically connected with the first electronic speed controller 26, the second electronic speed controller 27, the third electronic speed controller 28, the fourth electronic speed controller 29, the fifth electronic speed controller 30 and the sixth electronic speed controller 31.

Each of the electronic speed controllers may be electrically connected with a motor. The electronic speed controller may select the optimal control data from the received control data and control a rotation speed of the motor according to the optimal control data. In some embodiments, the UAV may comprise six motors including a first motor 32, a second motor 33, a third motor 34, a fourth motor 35, a fifth motor 36 and a sixth motor 37. The first electronic speed controller 26 is electrically connected with the first motor 32. The second electronic speed controller 27 is electrically connected with the second motor 33. The third electronic speed controller 28 is electrically connected with the third motor 34. The fourth electronic speed controller 29 is electrically connected with the fourth motor 35. The fifth electronic speed controller 30 is electrically connected with the fifth motor 36. The sixth electronic speed controller 31 is electrically connected with the sixth motor 37.

An operation of the UAV will be explained with reference to the embodiments.

The first electronic speed controller 26 and the first motor 32 may be taken as an example. First, the first electronic speed controller 26 may receive control data such as pitch data, roll data, yaw angle data, altitude data and other data from the first controller 20 through the first bus 23. The first electronic speed controller 26 may also receive control data from the second controller 21 through the second bus 24. The first electronic speed controller 26 may also receive control data from the third controller 22 through the third bus 25.

In some embodiments, after the control data is received by the first electronic speed controller 26, the first electronic speed controller 26 may select the control data, which is needed by the electronic speed controllers and has the most volume of data, from among at least three sets of control data as the optimal control data. For instance, under the circumstance of the control data is needed by all the electronic speed controllers, the control data from the first controller 20 is needed by the first electronic speed controller 26, the control data from the first controller 20 is needed by the second electronic speed controller 27, the control data from the second controller 21 is needed by the third electronic speed controller 28, the control data from the third controller 22 is needed by the fourth electronic speed controller 29, the control data from the first controller 20 is needed by the fifth electronic speed controller 30, and the control data from the second controller 21 is needed by the sixth electronic speed controller 31, then the control data from the first controller 20 is needed by three electronic speed controllers, the control data from the second controller 21 is needed by two electronic speed controllers, and the control data from the third controller 22 is needed by one electronic speed controller. Therefore, the control data from the first controller 20 needed by the electronic speed controllers has the most volume of data, and the control data from the first controller 20 is selected as the optimal control data.

Alternatively, after the control data is received by the first electronic speed controller 26, the first electronic speed controller 26 may sort the received control data in a descending order or an ascending order, and determine whether the number of sets of control data is odd. If the number of sets of control data as received is odd, then the (n+1)/2-th one of the sorted sets of control data can be selected as the optimal control data; otherwise, the n/2-th or n/2+1-th one of the sorted sets of control data can be selected as the optimal control data, where n is the number of the at least three sets of control data. For instance, if n=3, then the control data received from the second controller 21 can be selected as the optimal control data.

Alternatively, after the control data is received by the first speed controller 26, the first electronic speed controller 26 may determine whether the data in the received control data is in compliance with currently desirable values. For instance, it may first determine whether the pitch data, the roll data, the yaw angle data, the altitude data and other data exceed a predetermined value. If the predetermined value is not exceeded, it may further determine whether the pitch data, the roll data, the yaw angle data, the altitude data and other data being closest to standard values which are currently desirable for the operation of the UAV. If the values being closest to the standard values, then the control data may be determined to be in compliance with the currently desirable values and selected as the optimal control data. For instance, if the pitch data, the roll data, the yaw angle data, the altitude data and other data received from the first controller 20 and the second controller 21 do not exceed the predetermined value, however the pitch data from the first controller 20 are not closest to the standard value currently desirable for the operation of the UAV, and the pitch data from the second controller 21 is closest to the standard value currently desirable for the operation of the UAV, then the control data received from the second controller 21 may be determined to be in compliance with the currently desirable values and selected as the optimal control data.

Then, after the optimal control data is selected by the first electronic speed controller 26, it may further determine whether a difference between the optimal control data and other control date being within a predetermined range. If the difference is not within the predetermined range, then the optimal control data can be fed to the controllers corresponding to other control data, such that the controllers corresponding to other control data may correct their output control data.

Finally, the first electronic speed controller 26 may control the rotation speed of the first motor 32 according to the optimal control data. For instance, the first electronic speed controller 26 may control the rotation speed of the first motor 32 according to the pitch data, the roll data, the yaw angle data, the altitude data or other data.

In case the control data from the first controller 20 is the optimal control data, if the first controller 20 fails to work, then the first electronic speed controller 26 may re-select optimal control data from the control data as received from the second controller 21 and the third controller 22, so as to enable the UAV to maintain a normal operation.

The operating principle of the second electronic speed controller 27, the third electronic speed controller 28, the fourth electronic speed controller 29, the fifth electronic speed controller 30 and the sixth electronic speed controller 31 can be the same as that of the first electronic speed controller 26. Any detailed description is omitted here.

Figure 3:
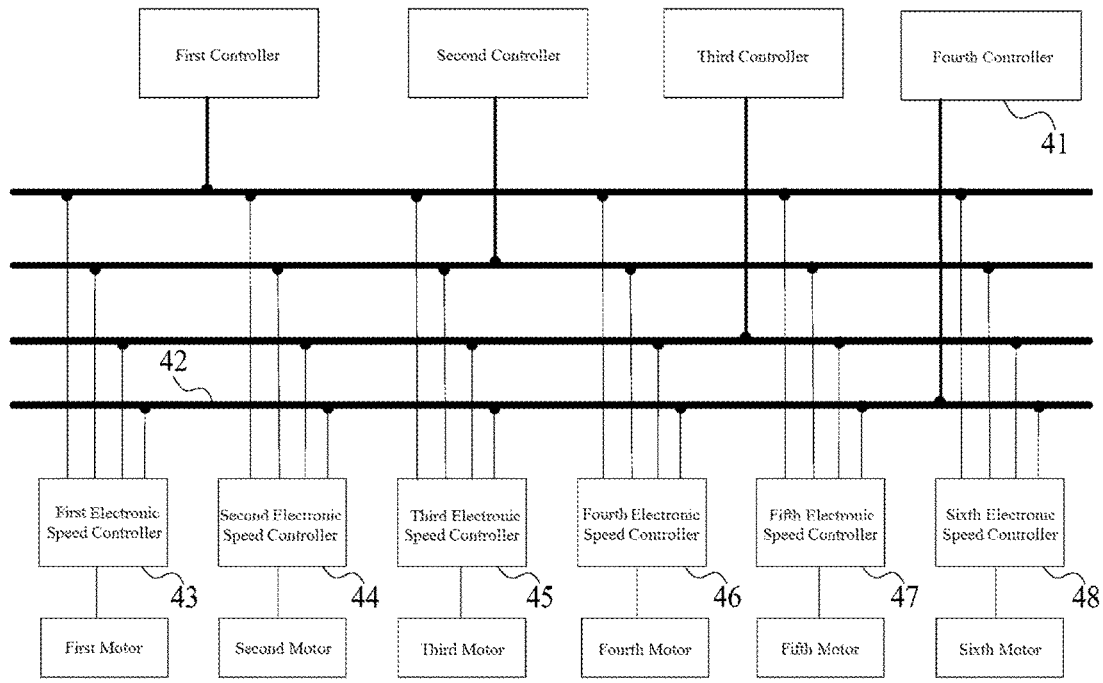
FIG. 3 is a diagram showing a structure of a second embodiment of an unmanned aerial vehicle according to the disclosure.

FIG. 3 is a diagram showing a structure of a second embodiment of an unmanned aerial vehicle according to the disclosure. The operating principle of the UAV of the second embodiment is similar to that of the UAV of the first embodiment, except that the UAV may further comprise a fourth controller 41 which is electrically connected with a fourth bus 42. In some embodiments, the fourth bus 42 is electrically connected with a first electronic speed controller 43, a second electronic speed controller 44, a third electronic speed controller 45, a fourth electronic speed controller 46, a fifth electronic speed controller 47 and a sixth electronic speed controller 48.

Figure 4:
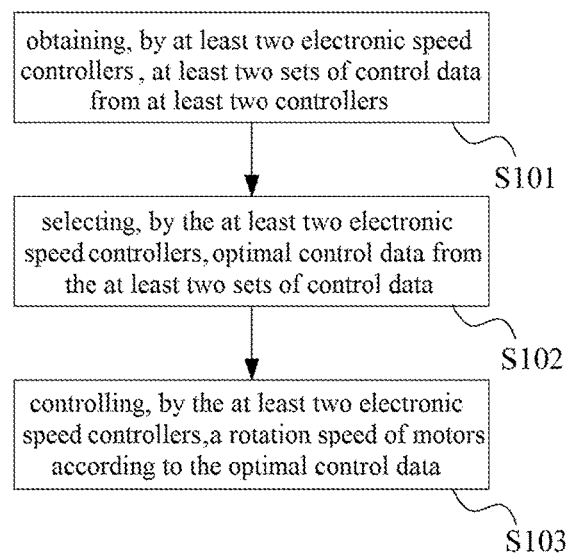
FIG. 4 is a flowchart of a data processing method of an unmanned aerial vehicle according to the disclosure.

FIG. 4 is a flowchart of a data processing method of an unmanned aerial vehicle according to the disclosure. The UAV of FIG. 4 may correspond to the UAV of FIG. 2, as discussed hereinabove. In some embodiments, the method may comprise the following steps.

S101: obtaining, by at least two electronic speed controllers, at least two sets of control data from at least two controllers.

In some embodiments, each of the at least two sets of control data comprises pitch data, roll data, yaw angle data, altitude data and other data.

S102: selecting, by the at least two electronic speed controllers, optimal control data from the at least two sets of control data.

In some embodiments, the at least two electronic speed controllers may select the control data, which is needed by the electronic speed controllers and has the most volume of data, from among the at least two sets of control data as the optimal control data.

Alternatively, the at least two electronic speed controllers may sort the at least two sets of control data in a descending order or an ascending order, and determine whether the number of the at least two sets of control data is odd. If the number of sets of control data as received is odd, then the (n+1)/2-th one of the sorted sets of control data can be selected as the optimal control data; otherwise, the n/2-th or n/2+1-th one of the sorted sets of control data can be selected as the optimal control data, where n is the number of the at least two sets of control data.

Alternatively, the at least two electronic speed controllers may determine whether data in the received control data is in compliance with currently desirable values. For instance, it may first determine whether the pitch data, the roll data, the yaw angle data, the altitude data and other data exceed a predetermined value. If the predetermined value is not exceeded, it may further determine whether the pitch data, the roll data, the yaw angle data, the altitude data and other data being closest to standard values which are currently desirable for the operation of the UAV. If the values are closest to the standard values, then the control data may be determined to be in compliance with the currently desirable values and selected as the optimal control data.

In some embodiments, after the optimal control data is selected, the at least two electronic speed controllers may determine whether a difference between the optimal control data and other control data being within a predetermined range. If the difference is not within the predetermined range, then the optimal control data may be fed to the controllers corresponding to other control data.

S103: controlling, by the at least two electronic speed controllers, a rotation speed of motors according to the optimal control data.

In some embodiments, if the controller from which the optimal control data being received fails to work, then the electronic speed controllers may re-select optimal control data from the control data received from other controllers, so as to enable the UAV to maintain a normal operation.

The unmanned aerial vehicle of the present disclosure may comprise at least two controllers, at least two electronic speed controllers and at least two motors. The at least two electronic speed controllers may be electrically connected with the at least two controllers, so as to receive at least two sets of control data from the at least two controllers. The at least two electronic speed controllers may further be electrically connected with a corresponding one of the motors, respectively. The at least two electronic speed controllers may each select optimal control data from the at least two sets of control data and control a rotation speed of the motors according to the optimal control data. In this way, the electronic speed controllers of the present disclosure may be able to receive data directly from the controllers, and select the optimal control data for controlling the rotation speed of the motors. If a controller from which the optimal control data being received fails to work, the at least two electronic speed controllers may receive control data from other controllers and perform normal data transmission, thereby effectively reducing safety risks and design costs.

The foregoing disclosure is merely illustrative of the embodiments of the disclosure, and is not intended to limit the patentable scope of the disclosure. Any equivalent structural or flow variations made on the basis of the description and the drawings of the disclosure, and their direct or indirect applications to other relevant technical fields, shall fall into the patentable scope of the disclosure.

What is claimed is:

1. An unmanned aerial vehicle, comprising at least two controllers, at least two electronic speed controllers and at least two motors,
    wherein the at least two electronic speed controllers are electrically connected with the at least two controllers to obtain at least two sets of control data respectively from the at least two controllers; and
    wherein the at least two electronic speed controllers are electrically connected with a corresponding one of the at least two motors respectively, and each of the at least two electronic speed controllers selects optimal control data from the at least two sets of control data and controls the rotation speed of the corresponding motor according to the optimal control data.

2. The unmanned aerial vehicle of claim 1, wherein after the optimal control data is selected, the at least two electronic speed controllers determine whether a difference between the optimal control data and other control data being within a predetermined range, and if the difference is not within the predetermined range, the at least two electronic speed controllers feed the optimal control data to the controllers corresponding to the other control data.

3. The unmanned aerial vehicle of claim 1, wherein the at least two electronic speed controllers select the control data, which is needed by the at least two electronic speed controllers and has the most volume of data, from among the at least two sets of control data as the optimal control data.

4. The unmanned aerial vehicle of claim 1, wherein the at least two electronic speed controllers sort the at least two sets of control data in a descending order or an ascending order, and determine whether the number of the at least two sets of control data is odd; if the number of the at least two sets of control data is odd, the at least two electronic speed controllers select the (n+1)/2-th one of the sorted sets of control data as the optimal control data; otherwise, the at least two electronic speed controllers select the n/2-th or n/2+1-th one of the sorted sets of control data as the optimal control data, wherein n is the number of the at least two sets of control data.

5. The unmanned aerial vehicle of claim 1, wherein each of the at least two sets of control data comprises pitch data, roll data, yaw angle data and altitude data.

6. A data processing method of an unmanned aerial vehicle, the unmanned aerial vehicle comprising at least two controllers, at least two electronic speed controllers and at least two motors, the at least two electronic speed controllers being electrically connected with the at least two controllers, and the at least two electronic speed controllers being electrically connected with a corresponding one of the at least two motors respectively, said method comprises:
    obtaining, by the at least two electronic speed controllers, at least two sets of control data respectively from the at least two controllers;
    selecting, by the at least two electronic speed controllers, optimal control data from the at least two sets of control data; and
    controlling, by the at least two electronic speed controllers, the rotation speed of the at least two motors according to the optimal control data.

7. The method of claim 6, wherein after the selecting the optimal control data by the at least two electronic speed controllers, said method further comprises the steps of:
    determining whether a difference between the optimal control data and other control data being within a predetermined range, and if the difference is not within the predetermined range, feeding the optimal control data to the controllers corresponding to other control data.

8. The method of claim 6, wherein the selecting the optimal control data from the at least two sets of control data by the at least two electronic speed controllers comprises:
    selecting, by the at least two electronic speed controllers, the control data which is needed by the at least electronic speed controllers and has the most volume of data from among the at least two sets of control data as the optimal control data.

9. The method of claim 6, wherein the selecting the optimal control data from the at least two sets of control data by the at least two electronic speed controllers comprises:
    sorting, by the at least two electronic speed controllers, the at least two sets of control data in a descending order or an ascending order, and determining whether the number of the at least two sets of control data is odd; if the number of the at least two sets of control data is odd, selecting the (n+1)/2-th one of the sorted sets of control data as the optimal control data; otherwise, selecting the n/2-th or n/2+1-th one of the sorted sets of control data as the optimal control data, wherein n is the number of the at least two sets of data.

* * * * *